(12) United States Patent
Parker

(10) Patent No.: US 7,600,764 B1
(45) Date of Patent: Oct. 13, 2009

(54) PEDESTRIAN TRAILER

(76) Inventor: George Parker, P.O. Box 534, Cody, WY (US) 82414

( * ) Notice: Subject to any disclaimer, the term of this patent is extended or adjusted under 35 U.S.C. 154(b) by 413 days.

(21) Appl. No.: 11/714,505

(22) Filed: Mar. 6, 2007

Related U.S. Application Data

(63) Continuation-in-part of application No. 11/191,753, filed on Jul. 27, 2005, now Pat. No. 7,322,584.

(51) Int. Cl.
B62B 7/02 (2006.01)
B62B 1/00 (2006.01)
B60D 1/155 (2006.01)
B60D 1/54 (2006.01)

(52) U.S. Cl. ............... 280/47.131; 280/47.3; 280/47.32; 280/47.33; 280/416; 280/491.2; 280/656

(58) Field of Classification Search ............ 280/47.131, 280/47.3, 47.32, 47.33, 416, 491.2, 656
See application file for complete search history.

(56) References Cited

U.S. PATENT DOCUMENTS

| 5,215,318 | A | | 6/1993 | Capraro |
| 5,215,355 | A | * | 6/1993 | Klumpjan ...................... 298/6 |
| 5,385,355 | A | | 1/1995 | Hoffman |
| 5,865,499 | A | | 2/1999 | Keyser |
| 5,901,968 | A | | 5/1999 | Niedersteiner |
| 6,007,373 | A | | 12/1999 | Chew |
| 6,487,837 | B1 | | 12/2002 | Fillman et al. |
| 7,484,737 | B2 | * | 2/2009 | Satorius ...................... 280/1.5 |
| 2004/0262052 | A1 | * | 12/2004 | Jessen ......................... 180/16 |
| 2006/0145439 | A1 | * | 7/2006 | Swartz et al. .......... 280/47.131 |

* cited by examiner

*Primary Examiner*—Christopher P Ellis
*Assistant Examiner*—John R Olszewski
(74) *Attorney, Agent, or Firm*—Gerald D Haynes; R. Keith Harrison

(57) ABSTRACT

A pedestrian trailer is disclosed. An illustrative embodiment of the pedestrian trailer includes a towing belt, a hitch coupling provided on the towing belt and a wheeled trailer frame detachably coupled to the hitch coupling and having a trailer interior.

18 Claims, 7 Drawing Sheets

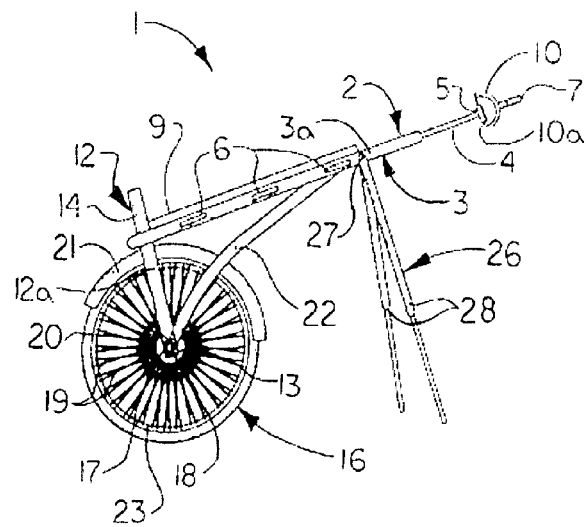
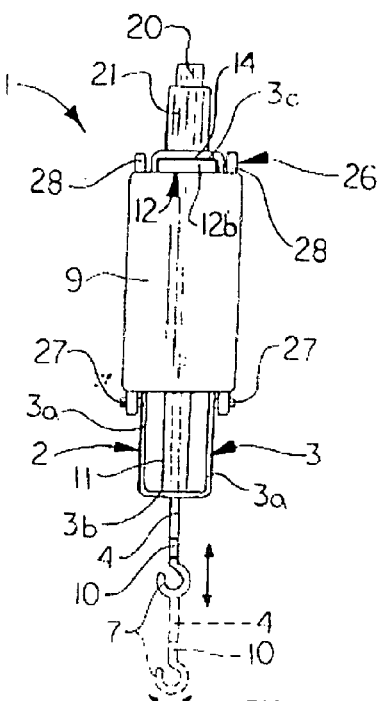
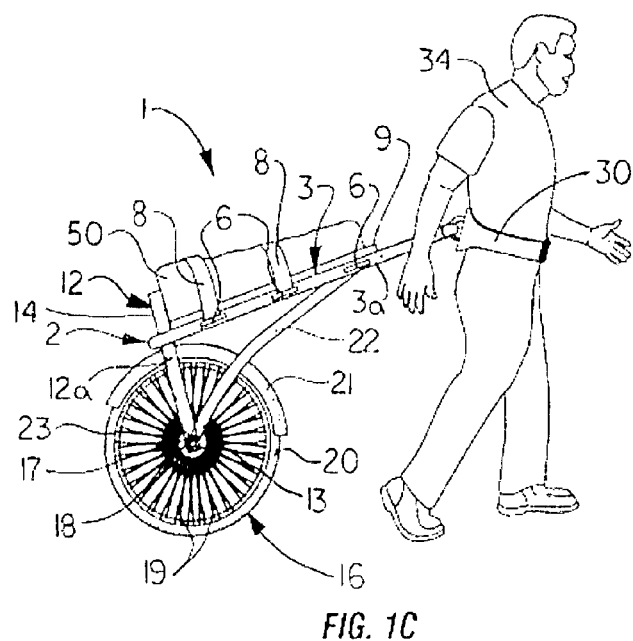
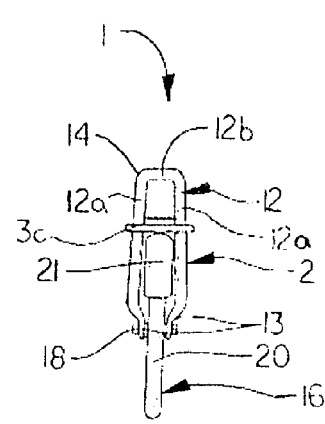
FIG. 1A
FIG. 1B
FIG. 1C
FIG. 1D

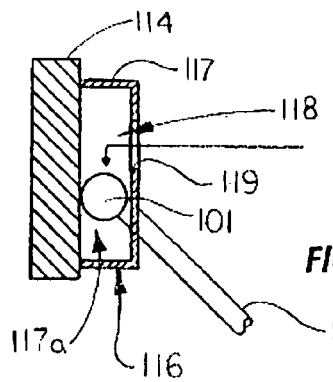
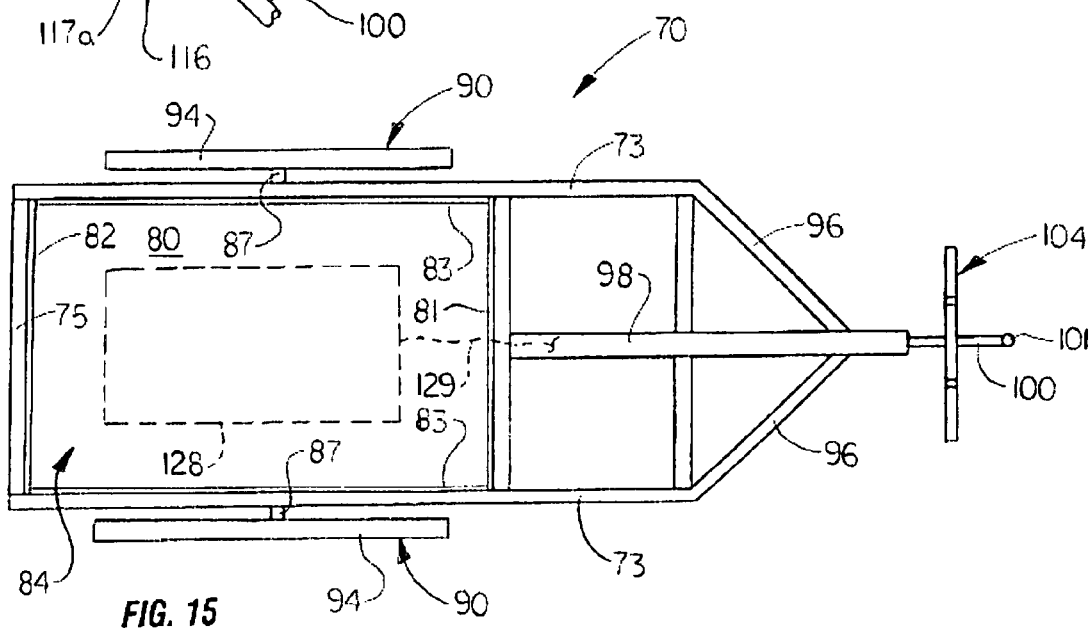
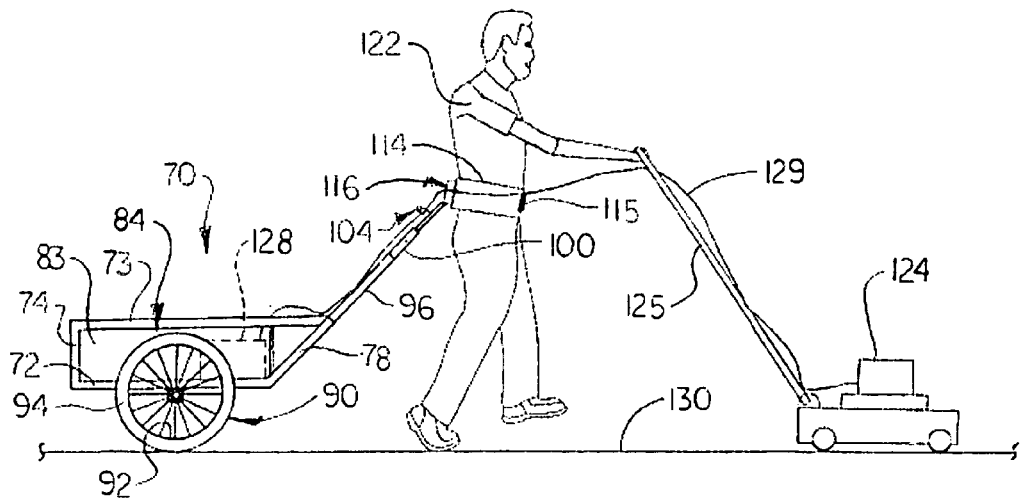

PEDESTRIAN TRAILER

CROSS-REFERENCE TO RELATED APPLICATION

This application is a continuation-in-part of application Ser. No. 11/191,753, filed Jul. 27, 2005 now U.S. Pat. No. 7,322,584 and entitled "Pedestrian Trailer", which is incorporated by reference herein in its entirety.

The present invention relates to wheeled trailers which support a load and can be pulled or towed by a pedestrian. More particularly, the present invention relates to a pedestrian trailer which is lightweight and enables a pedestrian to easily pull a load while camping or hiking, for example.

BACKGROUND OF THE INVENTION

Various outdoor pursuits such as hiking and camping, for example, frequently require that participants carry a load, typically in a backpack. The backpack may contain various hiking and/or camping gear such as a tent, food, clothing and the like which is necessary or desirable for the sustenance and comfort of the hiker or camper. However, for some persons, such as those who suffer back and/or joint problems, backpacks are uncomfortable to carry. Therefore, a lightweight pedestrian trailer is needed which is capable of carrying a sizable load and can be comfortably towed by a pedestrian when engaged in an outdoor pursuit such as hiking or camping, for example.

SUMMARY OF THE INVENTION

The present invention is generally directed to a pedestrian trailer. An illustrative embodiment of the pedestrian trailer includes a towing belt, a hitch coupling provided on the towing belt and a wheeled trailer frame detachably coupled to the hitch coupling and having a trailer interior.

BRIEF DESCRIPTION OF THE DRAWINGS

The invention will now be described, by way of example, with reference to the accompanying drawings, in which:

FIG. 1A is a side view of an illustrative embodiment of the pedestrian trailer according to the present invention, with a kickstand of the pedestrian trailer deployed in a trailer-supporting position when the pedestrian trailer is not being towed;

FIG. 1B is a top view of the pedestrian trailer illustrated in FIG. 1, with the kickstand deployed in a storage or non-supporting position;

FIG. 1C is a side view of the pedestrian trailer being towed by a pedestrian, with the kickstand removed for clarity;

FIG. 1D is a rear view of the pedestrian trailer;

FIG. 14 is a sectional view, taken along section lines 14-14 in FIG. 13;

FIG. 15 is a top view of an illustrative embodiment of the pedestrian trailer, with a battery (shown in phantom) provided in the trailer;

FIG. 16 is a side view of an illustrative embodiment of the pedestrian trailer, coupled to a belt worn by a pedestrian as a lawnmower is pushed by the pedestrian, with the lawnmower connected to the battery.

DETAILED DESCRIPTION OF THE INVENTION

Figure 2:
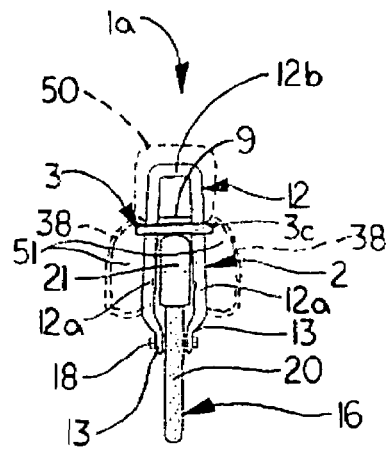
FIG. 2 is a rear view of another illustrative embodiment of the pedestrian trailer according to the present invention, illustrating multiple pockets provided on the pedestrian trailer for carrying various items.

Referring initially to FIGS. 1A-1D, 4 and 5 of the drawings, an illustrative embodiment of the pedestrian trailer according to the present invention is generally indicated by reference numeral 1. The pedestrian trailer 1 includes a trailer frame 2 which may be a lightweight metal such as aluminum or may be steel or any suitable alternative metal or material. The trailer frame 2 may have a generally L-shaped configuration and include an elongated, generally rectangular top frame member 3 which, as shown in FIG. 1B, may include a pair of generally elongated, parallel side frame bars 3a and a front frame bar 3b and a rear frame bar 3c spanning opposite ends of the side frame bars 3a. However, the top frame member 3 may have alternative shapes and configurations which are consistent with the functional requirements of the pedestrian trailer 1.

The trailer frame 2 typically further includes a wheel mount frame member 12 which is welded or otherwise attached to the rear frame bar 3c and extends between the side frame bars 3a of the top frame member 3. As shown in FIG. 1D, the wheel mount frame member 12 may have a generally inverted U-shape and typically includes a pair of elongated, parallel, spaced-apart side frame bars 12a connected by a cross bar 12b. The wheel mount frame member 12 is disposed in generally perpendicular relationship to the longitudinal axis of the top frame member 3 of the trailer frame 2. The lower ends of the wheel mount frame member 12 terminate in a pair of spaced-apart axle mount flanges 13. As illustrated in FIG. 1A, an extended portion 14 of the wheel mount frame member 12 preferably extends upwardly beyond the plane of the top frame member 3 of the trailer frame 2.

A wheel 16 is rotatably mounted on the wheel mount frame member 12 of the trailer frame 2. The wheel 16 typically includes a wheel axle 18 which is mounted between the axle mount flanges 13 of the wheel mount frame member 12; a wheel hub 17 mounted on the wheel axle 18; a wheel rim 23 on which is mounted a tire 20, which may be pneumatic; and spokes 19 extending between the wheel hub 17 and the wheel rim 23. A pair of frame braces 22 (one of which is shown in FIG. 1A) may extend from the respective axle mount flanges 13 of the wheel mount frame member 12 and terminate on the respective side frame bars 3a of the top frame member 3, to which the frame braces 22 are welded or otherwise attached. A generally arcuate fender 21 may be mounted between the side frame bars 12a of the wheel mount frame member 12 and/or the frame braces 22 to cover the upper curvature of the wheel 16.

As illustrated in FIGS. 1A and 1C, multiple strap loops 6 may extend from each side frame bar 3a of the top frame member 3, in spaced-apart relationship to each other. A platform 9, which may have a generally elongated, rectangular configuration, as illustrated in FIG. 1B, is mounted on the top frame member 3 of the trailer frame 2. The rear end of the platform 9 may abut against the extended portion 14 of the wheel mount frame member 12. As illustrated in FIG. 1C, in typical use of the pedestrian trailer 1 as will be hereinafter described, a load 50 can be placed on the platform 9 and one or multiple straps 8 extended over the load 50, through the strap loops 6 and fastened to secure the load 50 on the platform 9. However, it will be recognized and understood that the load 50 can additionally or alternatively be fastened to the platform 9 using any suitable technique known to those skilled in the art.

An elongated belt attachment shaft 4 may be provided on the trailer frame 2. Preferably, a selected length of the belt attachment shaft 4 may be selectively extendible from the trailer frame 2. For example, the belt attachment shaft 4 may be selectively and slidably or telescopically extendable from a belt attachment receptacle 11 that is provided on the trailer frame 2. A pin (not illustrated) may be inserted through registering pin openings (not illustrated) provided in the belt attachment receptacle 11 and belt attachment shaft 4, for example, to secure a selected length of the belt attachment shaft 4 in an extended configuration from the belt attachment receptacle 11. Alternative locking mechanisms known by those skilled in the art may be used to lock the belt attachment shaft 4 with respect to the trailer frame 2.

Figure 4:
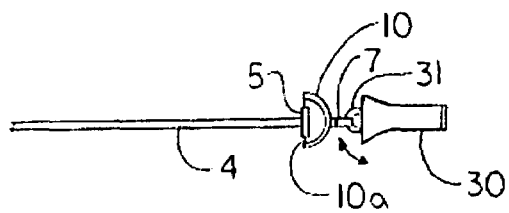
FIG. 4 is a side view of an illustrative attachment arrangement for removably and pivotally attaching the pedestrian trailer to a load-stabilizing towing belt to be worn by a pedestrian.

In one embodiment of the invention which is illustrated in FIGS. 1A, 1B and 4 of the drawings, a socket 5 is provided on the distal or extending end of the belt attachment shaft 4. A pivot bracket 10, which may have a generally semicircular configuration, is provided with a pair of pivot pins 10a which extend toward each other. The pivot pins 10a are inserted in the respective ends of the socket 5 to pivotally mount the pivot bracket 10 on the socket 5. A belt attachment hook 7 extends forwardly from the pivot bracket 10. Accordingly, as indicated by the double-headed curved arrow in FIG. 1B, the belt attachment hook 7 is capable of being pivoted in a generally horizontal plane or side-to-side motion as the pivot bracket 10 pivots with respect to the socket 5.

As illustrated in FIG. 1C, a load-stabilizing towing belt 30 is adapted to be worn around the waist of a pedestrian 34. As illustrated in FIG. 4, a hook receptacle 31 is provided on the rear surface of the load-stabilizing towing belt 30 for detachably engaging the belt attachment hook 7. Accordingly, the pedestrian trailer 1 is adapted to be towed by the pedestrian 34 as the pedestrian 34 wears the load-stabilizing towing belt 30 while the belt attachment hook 7 engages the hook receptacle 31. The belt attachment hook 7 is capable of pivoting in a generally vertical plane or up-and-down motion with respect to the hook receptacle 31 of the load-stabilizing towing belt 30.

Figure 5:
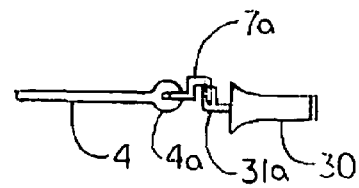
FIG. 5 is a side view of an alternative attachment arrangement for removably and pivotally attaching the pedestrian trailer to a load-stabilizing towing belt.

As illustrated in FIG. 5, in an alternative embodiment of the invention, a shaft eye 4a is provided on the distal or extending end of the belt attachment shaft 4. A belt attachment hook 7a is pivotally attached to the shaft eye 4a such that the belt attachment hook 7a is capable of pivoting in a generally vertical plane or up-and-down motion with respect to the shaft eye 4a. A hook receptacle 31a extends from the rear surface of the load-stabilizing towing belt 30. The belt attachment hook 7a is adapted to detachably and pivotally engage the hook receptacle 31a in such a manner that the hook receptacle 31a is capable of pivoting in a generally horizontal plane or side-to-side motion with respect to the belt attachment hook 7a.

A kickstand 26 may be provided on the trailer frame 2. The kickstand 26 may include a pair of kickstand legs 28 which are pivotally attached to the respective side frame bars 3a of the top frame member 3 typically using pivot bolts 27, as illustrated in FIG. 1B. Accordingly, the kickstand 26 can be selectively deployed in a downwardly-extended, supporting position, as illustrated in FIG. 1A, when the pedestrian trailer 1 is not being towed, to support the pedestrian trailer 1 in a self-standing position on the ground (not illustrated) or other supporting surface. The kickstand 26 can be selectively pivoted from the downwardly-extended, supporting position illustrated in FIG. 1A to a retracted position illustrated in FIG. 1B, in which the kickstand legs 28 extend on opposite sides of the trailer frame 2 and beneath the platform 9, when towing of the pedestrian trailer 1 is desired.

Referring to FIG. 1C of the drawings, in typical use of the pedestrian trailer 1, a load 50 is initially secured on the platform 9 by placing the load 50 on the platform 9, typically extending the strap or straps 8 over the load 50 and through the strap loops 6, and then fastening and tightening the strap or straps 8. The load 50 may include provisions for a hiking or camping expedition, such as food, clothing and/or a tent and other hiking or camping equipment, for example. The load-stabilizing towing belt 30 is fastened around the waist of a pedestrian 34, with the hook receptacle 31 extending from the rear surface of the load-stabilizing towing belt 30. The belt attachment hook 7 on the trailer frame 2 is then attached to the hook receptacle 31 on the load-stabilizing towing belt 30. With the kickstand 26 in the raised, non-supporting position of FIG. 1B, the pedestrian 34 then tows the pedestrian trailer 1 by walking forwardly as the wheel 16 rolls on the ground (not illustrated) and the trailer frame 2 and load 50 thereon travel on the rolling wheel 16. It will be appreciated that the belt attachment shaft 4 is capable of pivoting in a side-to-side motion or horizontal plane with respect to the belt attachment hook 7, whereas the load-stabilizing towing belt 30 is capable of pivoting in an up-and-down motion or vertical plane with respect to the belt attachment hook 7.

Upon arrival of the pedestrian 34 and the towed pedestrian trailer 1 at a desired destination, the pedestrian trailer 1 is detached from the load-stabilizing towing belt 30 by unfastening the belt attachment hook 7 on the trailer frame 2 from the hook receptacle 31 of the load-stabilizing towing belt 30. The pedestrian trailer 1 can then be deployed in the self-standing position by pivoting the kickstand 26 from the upper position illustrated in FIG. 1B to the lowered, supporting position illustrated in FIG. 1A. This facilitates removal of the load 50 from the platform 9 typically by unfastening and removing the strap or straps 8 from the strap loops 6 and removing the load 50 from the trailer frame 2.

Referring next to FIG. 2 of the drawings, another embodiment of the pedestrian trailer 1a includes at least one, and preferably, a pair of pockets 38 (shown in phantom) provided on one or both sides of the trailer frame 2. Each of the pockets 38 is adapted to hold a load 51 in addition to the load 50 which is carried on the platform 1 as was heretofore described with respect to the pedestrian trailer 1 shown in FIGS. 1A-1D.

Figure 3:
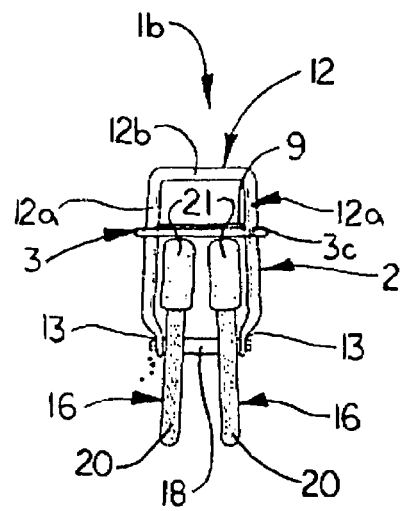
FIG. 3 is a rear view of a dual-wheel embodiment of the pedestrian trailer.

Referring next to FIG. 3 of the drawings, still another embodiment of the pedestrian trailer 1b includes a pair of wheels 16 which are mounted adjacent to each other typically on a common wheel axle 18. A pair of fenders 21 may be mounted on the trailer frame 2, over the upper curvatures of the respective wheels 16.

Figure 3A:
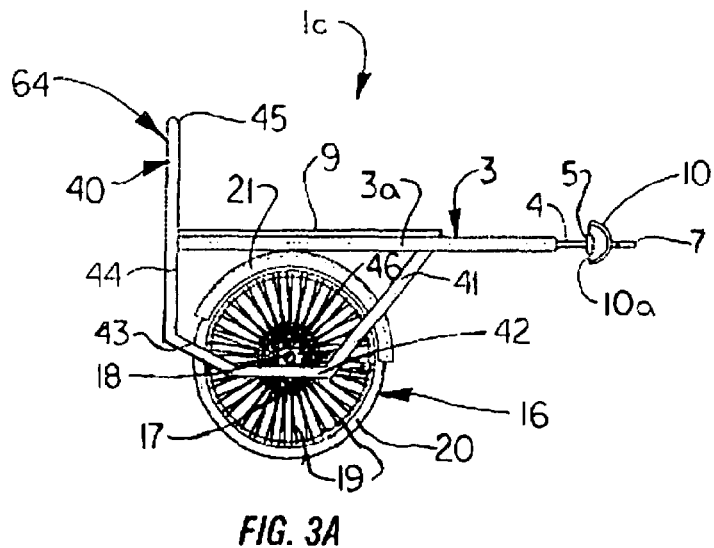
FIG. 3A is a side view of still another embodiment of the pedestrian trailer, more particularly illustrating an alternative trailer frame configuration for the pedestrian trailer.

Referring next to FIG. 3A of the drawings, yet another embodiment of the pedestrian trailer 1c according to the present invention has a modified trailer frame 64. The trailer frame 64 includes a top frame member 3 which may be similar in construction to the top frame member 3 of the trailer frame 2 on the pedestrian trailer 1 which was heretofore described with respect to FIGS. 1A-1D. A pair of wheel mount frame members 40 is provided in adjacent, spaced-apart relationship to each other on the respective side frame bars 3a of the top frame member 3. Each wheel mount frame member 40 typically includes a front frame segment 41 which angles downwardly and rearwardly from the bottom surface of the corresponding top frame member 3, a generally horizontal axle mount segment 42 which extends rearwardly at an obtuse angle from the front frame segment 41, a connecting frame segment 43 which extends upwardly at an obtuse angle from the axle mount segment 42, and a rear frame segment 44 which extends upwardly from the connecting frame segment 43. An axle bracket 46 typically extends upwardly from the axle mount segment 42 of each wheel mount frame member 40. The rear end of the top frame member 3 may be welded or otherwise attached to the rear frame segments 44 of the respective wheel mount frame members 40. Preferably, each rear frame segment 44 has an extended portion 45 which extends beyond the plane of the top frame member 3. The wheel axle 18, which mounts a wheel or wheels 16 to the trailer frame 64, is typically attached to the axle brackets 46 on the axle mount segments 42 of the respective wheel mount frame members 40. A generally arcuate fender 21 may be provided on the top frame member and/or each wheel mount frame member 40 to cover the upper curvature of each wheel 16. A platform 9 is typically provided on the top frame member 3. The axle brackets 46 of the wheel mount frame members 40 impart a low center of gravity to the trailer frame 64.

It is to be understood that the features of any of the embodiments of the pedestrian trailer heretofore described may be combined with any of the other embodiments of the pedestrian trailer. For example, the pockets 38 which were heretofore described with respect to the pedestrian trailer 1a of FIG. 2 may be combined with the pedestrian trailer 1c in FIG. 3A. Additionally, rather than having one wheel 16, the pedestrian trailer 1c of FIG. 3A may be fitted with two adjacent wheels 16 as was heretofore described with respect to the pedestrian trailer 1b of FIG. 3.

Figure 6:
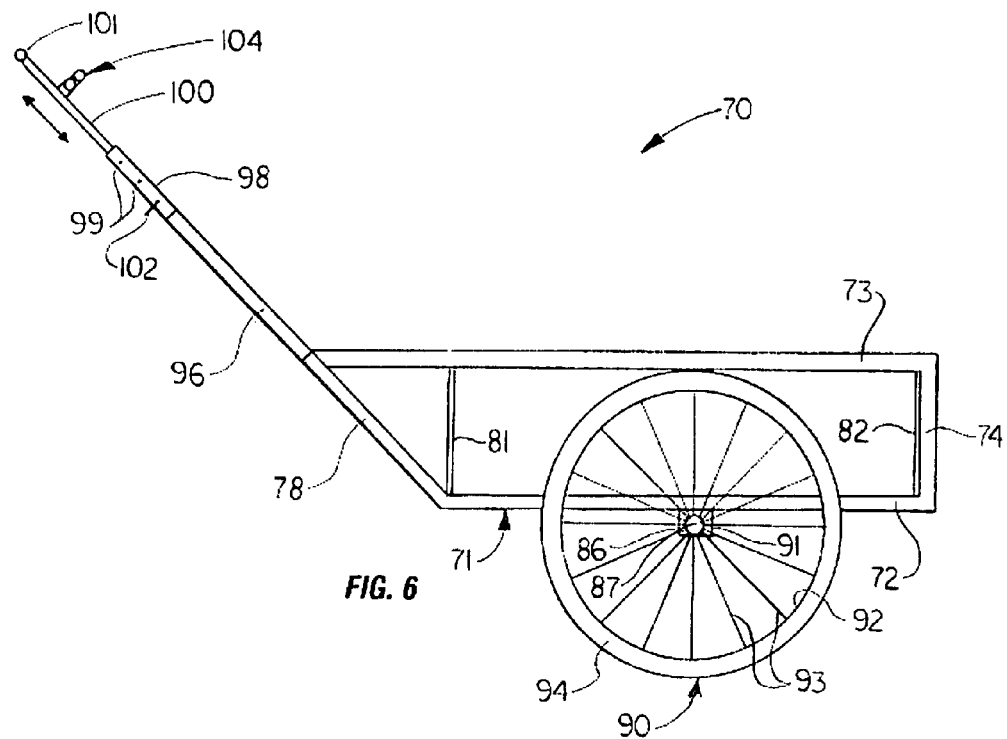
FIG. 6 is a side view of an alternative illustrative embodiment of the pedestrian trailer
Figure 7:
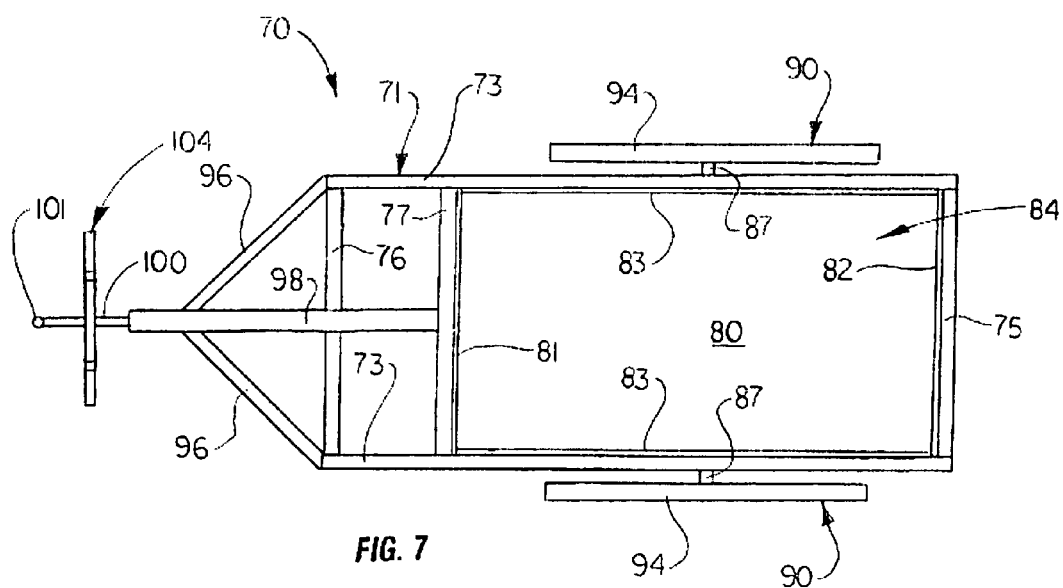
FIG. 7 is a top view of an illustrative embodiment of the pedestrian trailer.
Figure 8:
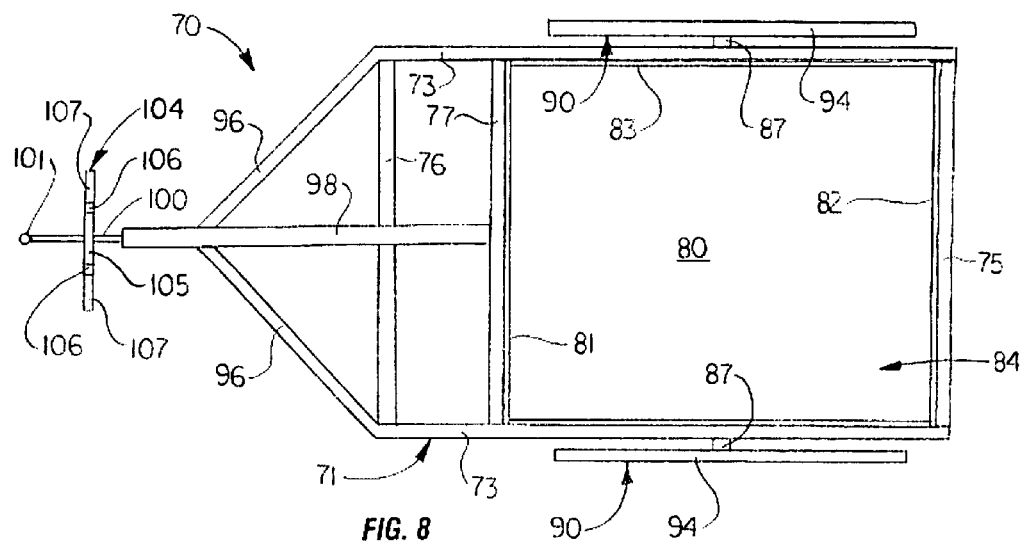
FIG. 8 is a top view of an alternative embodiment of the pedestrian trailer.

Referring next to FIGS. 6-16 of the drawings, an alternative illustrative embodiment of the pedestrian trailer is generally indicated by reference numeral 70. The pedestrian trailer 70 includes a trailer frame 71 typically having a pair of generally elongated, parallel, spaced-apart bottom frame members 72 (one of which is illustrated in FIGS. 6 and 8). A pair of generally elongated, parallel, spaced-apart top frame members 73 is disposed above the respective bottom frame members 72. A pair of rear frame members 74 (one of which is illustrated in FIG. 6) connects each bottom frame member 72 to the corresponding top frame member 73. As illustrated in FIG. 6, a front frame member 78 angles upwardly from each bottom frame member 72 and attaches to the corresponding top frame member 73. As illustrated in FIG. 7, a spanning frame member 75 extends between the rear ends of the top frame members 73.

As further illustrated in FIG. 7, a bottom panel 80 is supported by the bottom frame members 72. As illustrated in FIG. 6, a front panel 81 and a rear panel 82 extend from the bottom panel 80 and between the bottom frame members 72 and the rear frame members 73, in spaced-apart relationship with respect to each other. A pair of spaced-apart side panels 83 extends from the bottom panel 80 and between the front panel 81 and the rear panel 82. The bottom panel 80, front panel 81, rear panel 82 and side panels 83 together define a trailer interior 84.

A pair of trailer wheels 90 is provided on the trailer frame 71. A pair of axle supports 86 extends from the respective bottom frame members 72 of the trailer frame 71. A wheel axle 87 extends through the axle supports 86. Each trailer wheel 90 typically includes a wheel hub 91 which is provided on the wheel axle 87. A wheel rim 92 is connected to the wheel hub 91 through multiple spokes 93. Tires 94, which may be pneumatic or plastic, are typically provided on the respective wheel rims 92.

As further illustrated in FIG. 7, a rear frame brace 77 extends between the top frame members 73. An elongated hitch mount arm 98, which may be square tubing, for example, angles forwardly and upwardly from the rear frame brace 77. A front frame brace 76 extends between the top frame members 73 and reinforces the hitch mount arm 98. A pair of stabilizing frame members 96 may extend from the respective front frame members 78 and attach to opposite sides of the hitch mount arm 98 to stabilize the hitch mount arm 98 on the trailer frame 71.

An elongated hitch extension arm 100 is selectively extendable from the hitch mount arm 98. The hitch extension arm 100 may be locked at a selected extension length with respect to the hitch mount arm 98 using any suitable technique which is known by those skilled in the art. For example, as illustrated in FIG. 6, in some embodiments multiple, spaced-apart pin openings 99 are provided in the hitch mount arm 98. An arm extension pin 102 is extended through a selected one of the pin openings 99 and a registering pin opening (not illustrated) provided in the hitch extension arm 100. A hitch ball 101 terminates the hitch extension arm 100 for purposes which will be hereinafter described.

Figure 9:
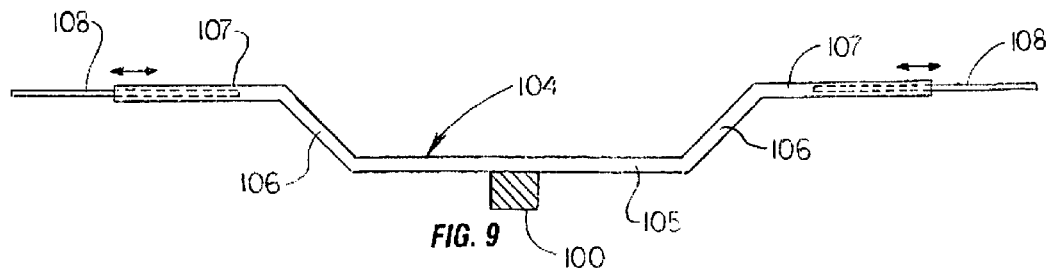
FIG. 9 is a front view of a handlebars element of an illustrative embodiment of the pedestrian trailer

In some embodiments of the pedestrian trailer 70, handlebars 104 are provided on the hitch extension arm 100. As illustrated in FIG. 9, in some embodiments the handlebars 104 includes an elongated middle segment 105 which is provided on the hitch extension arm 100. A pair of connecting segments 106 angles from respective ends of the middle segment 105. A pair of generally elongated outer segments 107 extends from the respective connecting segments 106. A grip segment 108 is selectively extendable from each outer segment 107. The grip segment 108 can be adjustably extended from each corresponding outer segment 107 using any suitable technique known by those skilled in the art. For example, in some embodiments, a pin (not illustrated) is extended through one of multiple spaced-apart pin openings (not illustrated) provided in the outer segment 107 and through a registering pin opening (not illustrated) provided in the grip segment 108.

Figure 10:
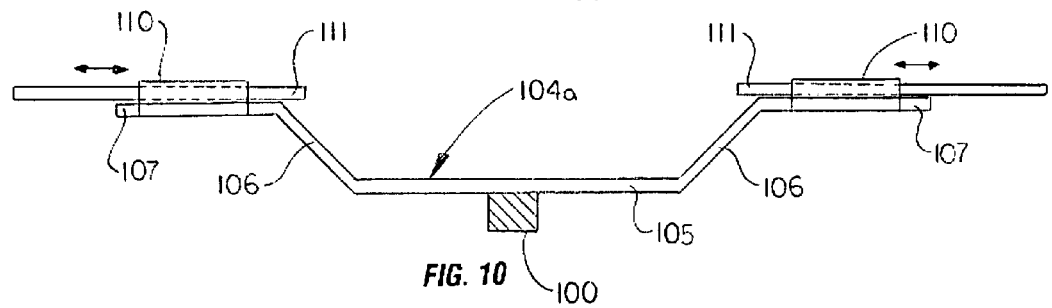
FIG. 10 is a front view of an alternative handlebars element of an illustrative embodiment of the pedestrian trailer.
Figure 11:
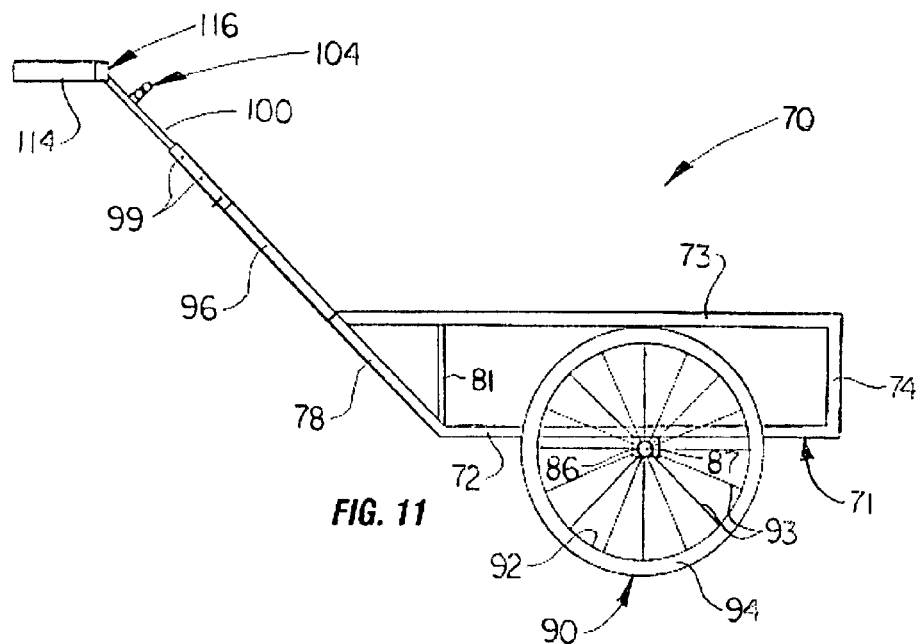
FIG. 11 is a side view of an illustrative embodiment of the pedestrian trailer, hitched to a belt.

As illustrated in FIG. 10, in some embodiments of the pedestrian trailer 70, the handlebars 104a include the middle segment 105 which is provided on the hitch extension arm 100; the connecting segments 106 which angle from the respective ends of the middle segment 105; and the outer segment 107 which extends from each connecting segment 106. A grip segment frame 110 is provided on each outer segment 107 and receives an elongated grip segment 111. The grip segment 111 can be adjustably extended from each corresponding grip segment frame 110 using any suitable technique known by those skilled in the art. For example, in some embodiments, a pin (not illustrated) is extended through one of multiple spaced-apart pin openings (not illustrated) provided in the grip segment frame 110 and through a registering pin opening (not illustrated) provided in the grip segment 111.

Figure 12:
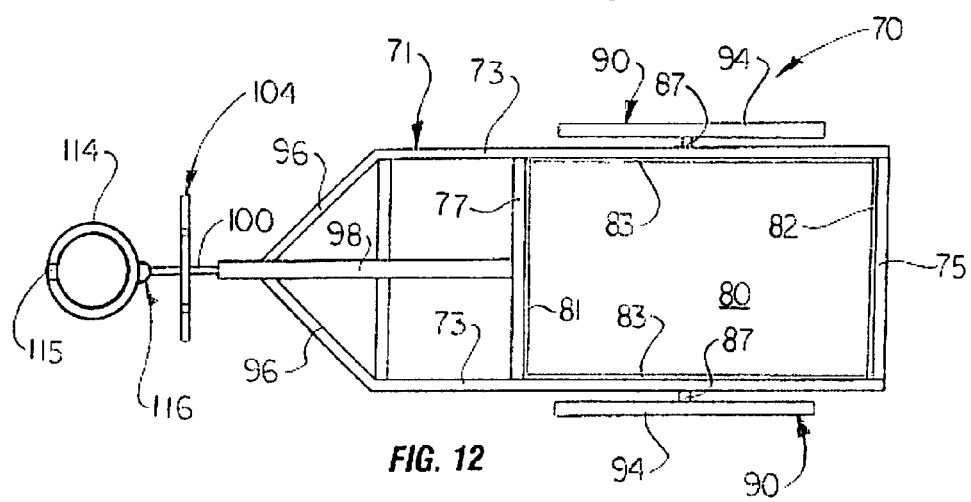
FIG. 12 is a top view of an illustrative embodiment of the pedestrian trailer, hitched to a belt.

As illustrated in FIGS. 8 and 12, the trailer frame 71 can be fabricated with a selected width depending on the intended use of the pedestrian trailer 70. For example, as illustrated in FIG. 8, a trailer frame 71 having a relatively large width is used for lawn and garden and the like applications of the pedestrian trailer 70. Alternatively, as illustrated in FIG. 12, a trailer frame 71 having a relatively narrow width is used for trail hiking and the like applications. Furthermore, the trailer wheels 90 can be fabricated with a selected diameter depending on the use of the pedestrian trailer 70, with trailer wheels 90 having a smaller diameter typically used for trail use and trailer wheels 90 having a larger diameter typically used for lawn and garden use.

Figure 13:
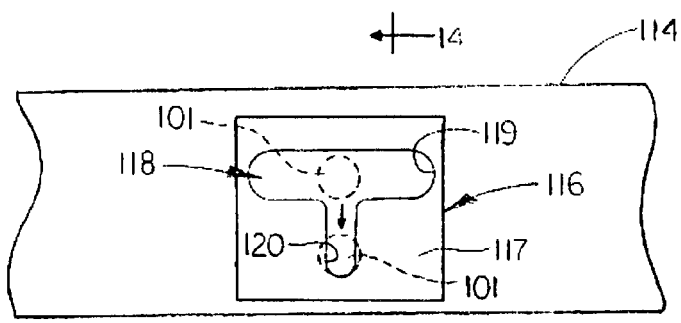
FIG. 13 is a sectional view of the belt, with a hitch coupling provided on the belt and a hitch ball (shown in phantom) inserted in the hitch coupling.

As illustrated in FIGS. 11-14, the hitch extension arm 100 is adapted to be detachably coupled or hitched to a towing belt 114 which is worn by a pedestrian 122 (FIG. 16) who tows the pedestrian trailer 70, as will be hereinafter described. A belt buckle 115, which may be conventional, is provided on the towing belt 114 to facilitate fastening of the towing belt 114 around the waist of the pedestrian 122. A hitch coupling 116 is provided on the towing belt 114. As illustrated in FIGS. 13 and 14, the hitch coupling 116 includes a coupling housing 117 having a coupling housing interior 117a (FIG. 14). A generally T-shaped coupling slot 118 is provided in the coupling housing 117 and communicates with the coupling housing interior 117a. As illustrated in FIG. 13, the coupling slot 118 typically includes a generally elongated insertion segment 119 and a lock segment 120 which communicates with the insertion segment 119. The width of the lock segment 120 is less than the diameter of the hitch ball 101 provided on the hitch extension arm 100. Accordingly, the pedestrian trailer 70 is detachably coupled or hitched to the towing belt 114 by inserting the hitch ball 101 on the hitch extension arm 100 in the insertion segment 119 of the coupling slot 118 and then sliding the hitch ball 101 into the lock segment 120 of the coupling slot 118, as illustrated in FIG. 14.

As illustrated in FIGS. 15 and 16, in an illustrative lawn and garden application, the pedestrian trailer 70 is used to carry a battery 128 (shown in phantom) which is connected to a battery-operated tool such as lawnmower 124, for example, to power the lawnmower 124. Accordingly, the battery 128 is placed on the bottom panel 80 inside the trailer interior 84. An electrical cord 129 extends from the lawnmower 124 and is connected to the battery 128. The towing belt 114 is fastened around the waist of the pedestrian 122, and the hitch extension arm 100 is hitched to the towing belt 114 typically as was heretofore described with respect to FIGS. 13 and 14. Accordingly, as illustrated in FIG. 16, the pedestrian 122 grips a lawnmower handle 125 on the lawnmower 124 and pushes the lawnmower 124 on a lawn 130 in the mowing of grass on the lawn 130 during operation of the lawnmower 124 as the battery 128 supplies electrical power to the lawnmower 124. As he or she pushes the lawnmower 124 on the lawn 130, the pedestrian 122 simultaneously tows or pulls the lawnmower 124 behind him or her. In the event that the pedestrian trailer 70 becomes difficult to tow due to rough terrain, for example, the pedestrian 122 can grip the handlebars 104 (FIG. 15) and push or pull the pedestrian trailer 70 to smoother terrain. Additional batteries and/or accessories (not illustrated) can be placed in the trailer interior 84 of the pedestrian trailer 70, as deemed necessary. It is to be understood that the battery 128 can be used to power or re-charge any compatible type of electric tool including an edger, blower, hedge trimmer, chain saw or drill, in non-exclusive particular. In other applications, the pedestrian trailer 70 can be used to tow camping equipment or the like (not illustrated) during hiking or camping expeditions, for example.

Figure 17:
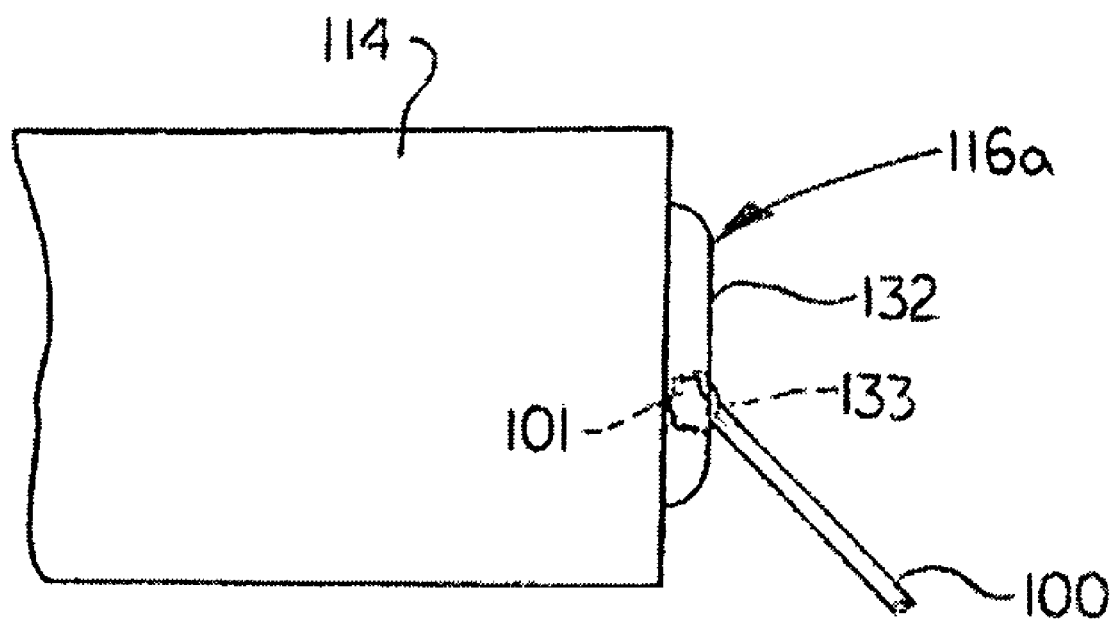
FIG. 17 is a side view, partially in section, of a towing belt element of an illustrative embodiment of the pedestrian trailer, more particularly illustrating a universal ball-and-socket joint adapted to receive a hitch ball provided on a hitch extension element of the pedestrian trailer.

Referring next to FIG. 17 of the drawings, in some embodiments the hitch coupling 116a on the towing belt 114 includes a coupling housing 132 having a coupling socket 133. The hitch ball 101 on the hitch extension arm 100 is snap-fitted or otherwise mounted in the coupling socket 133. Accordingly, the hitch ball 101, in combination with the coupling socket 133, forms a universal joint in which the hitch extension 100 is capable of swiveling in all directions with respect to the towing belt 114.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, I claim:

1. A pedestrian trailer, comprising:
   a towing belt;
   a hitch coupling provided on said towing belt; and
   a wheeled trailer frame detachably coupled to said hitch coupling and having a trailer interior; handlebars carried by said trailer frame; wherein said handlebars comprise a middle segment carried by said trailer frame; a pair of connecting segments extending from said middle segment; a pair of outer segments extending from said pair of connecting segments, respectively; and a pair of grip segments extendable from said pair of outer segments, respectively.

2. The pedestrian trailer of claim 1 wherein said handlebars further comprise a pair of grip segment frames provided on said pair of outer segments, respectively; and the pair of grip segments extendable from said pair of grip segment frames, respectively.

3. The pedestrian trailer of claim 1 wherein said trailer frame comprises a hitch mount arm and a hitch extension arm extendable from said hitch mount arm, and wherein said hitch extension arm is detachably coupled to said hitch coupling.

4. The pedestrian trailer of claim 3 further comprising handlebars provided on said hitch extension arm.

5. The pedestrian trailer of claim 4 wherein said handlebars comprises a middle segment carried by said hitch extension arm; a pair of connecting segments extending from said middle segment; a pair of outer segments extending from said pair of connecting segments, respectively; and a pair of grip segments extendable from said pair of outer segments, respectively.

6. The pedestrian trailer of claim 4 wherein said handlebars comprises a middle segment carried by said hitch extension arm; a pair of connecting segments extending from said middle segment; a pair of outer segments extending from said pair of connecting segments, respectively; a pair of grip segment frames provided on said pair of outer segments, respectively; and a pair of grip segments extendable from said pair of grip segment frames, respectively.

7. A pedestrian trailer, comprising:
a towing belt;
a hitch coupling provided on said towing belt;
a generally T-shaped coupling slot provided in said hitch coupling and having an insertion segment and a lock segment communicating with said insertion segment; and
a wheeled trailer frame having an elongated hitch extension arm and a hitch ball provided on said hitch extension arm and inserted in said lock segment of said coupling slot.

8. The pedestrian trailer of claim 7 further comprising handlebars carried by said trailer frame.

9. The pedestrian trailer of claim 8 wherein said handlebars comprises a middle segment carried by said trailer frame; a pair of connecting segments extending from said middle segment; a pair of outer segments extending from said pair of connecting segments, respectively; and a pair of grip segments extendable from said pair of outer segments, respectively.

10. The pedestrian trailer of claim 8 wherein said handlebars comprises a middle segment carried by said trailer frame; a pair of connecting segments extending from said middle segment; a pair of outer segments extending from said pair of connecting segments, respectively; a pair of grip segment frames provided on said pair of outer segments, respectively; and a pair of grip segments extendable from said pair of grip segment frames, respectively.

11. The pedestrian trailer of claim 7 wherein said trailer frame comprises a hitch mount arm and wherein said hitch extension arm is extendable from said hitch mount arm.

12. The pedestrian trailer of claim 11 further comprising handlebars provided on said hitch extension arm.

13. The pedestrian trailer of claim 12 wherein said handlebars comprises a middle segment carried by said hitch extension arm; a pair of connecting segments extending from said middle segment; a pair of outer segments extending from said pair of connecting segments, respectively; and a pair of grip segments extendable from said pair of outer segments, respectively.

14. The pedestrian trailer of claim 12 wherein said handlebars comprises a middle segment carried by said hitch extension arm; a pair of connecting segments extending from said middle segment; a pair of outer segments extending from said pair of connecting segments, respectively; a pair of grip segment frames provided on said pair of outer segments, respectively; and a pair of grip segments extendable from said pair of grip segment frames, respectively.

15. A pedestrian trailer, comprising:
a towing belt;
a hitch coupling provided on said towing belt;
a generally T-shaped coupling slot provided in said hitch coupling and having an insertion segment and a lock segment communicating with said insertion segment; and
a wheeled trailer frame having a hitch mount arm, an elongated hitch extension arm extendable from said hitch mount arm and a hitch ball having a diameter greater than a width of said lock segment provided on said hitch extension arm and inserted in said lock segment of said coupling slot.

16. The pedestrian trailer of claim 15 further comprising handlebars provided on said hitch extension arm.

17. The pedestrian trailer of claim 16 wherein said handlebars comprises a middle segment carried by said hitch extension arm; a pair of connecting segments extending from said middle segment; a pair of outer segments extending from said pair of connecting segments, respectively; and a pair of grip segments extendable from said pair of outer segments, respectively.

18. The pedestrian trailer of claim 16 wherein said handlebars comprises a middle segment carried by said hitch extension arm; a pair of connecting segments extending from said middle segment; a pair of outer segments extending from said pair of connecting segments, respectively; a pair of grip segment frames provided on said pair of outer segments, respectively; and a pair of grip segments extendable from said pair of grip segment frames, respectively.

* * * * *